(12) United States Patent
Wishengrad

(10) Patent No.: US 6,928,331 B2
(45) Date of Patent: Aug. 9, 2005

(54) ORIENTATION METHOD

(76) Inventor: David Robert Wishengrad, 3978 Goodwin Ct., Simi Valley, CA (US) 93063

( * ) Notice: Subject to any disclaimer, the term of this patent is extended or adjusted under 35 U.S.C. 154(b) by 0 days.

(21) Appl. No.: 10/410,464

(22) Filed: Apr. 8, 2003

(65) Prior Publication Data

US 2003/0193500 A1 Oct. 16, 2003

Related U.S. Application Data

(60) Provisional application No. 60/371,830, filed on Apr. 10, 2002.

(51) Int. Cl.⁷ .............................................. G06F 19/00
(52) U.S. Cl. .......................... 700/98; 700/182; 345/685
(58) Field of Search ................................ 700/181–182, 700/62, 98, 117, 180; 345/685, 418, 475; 359/458; 382/154

(56) References Cited

U.S. PATENT DOCUMENTS 5,919,493 A * 7/1999 Sheppard et al. ........ 425/174.2
6,120,171 A * 9/2000 Shaikh ........................ 700/98

* cited by examiner

Primary Examiner—Kidest Bahta
(74) Attorney, Agent, or Firm—Mark Levy & Associates, PLLC

(57) ABSTRACT

A computerized orientation method that automatically extracts the three bounding box size values of CAD objects and then copies the values into the appropriate length, width and thickness columns of a grid or table. The process uses data stored in an orientation tag of three defined positions and three defined variables and compares the three bounding box distance values to each other.

9 Claims, 3 Drawing Sheets

| LARGEST OF 3 VALUES COMPARED TO EACH OTHER | REMAINDER OF 3 VALUES COMPARED TO EACH OTHER | SMALLEST OF 3 VALUES COMPARED TO EACH OTHER | LARGEST OF 3 VALUES COMPARED TO EACH OTHER | SMALLEST OF 3 VALUES COMPARED TO EACH OTHER | REMAINDER OF 3 VALUES COMPARED TO EACH OTHER |
|---|---|---|---|---|---|
| AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS |
| ORIENTATION TAG TYPE 1 | | | ORIENTATION TAG TYPE 2 | | |
| SMALLEST OF 3 VALUES COMPARED TO EACH OTHER | LARGEST OF 3 VALUES COMPARED TO EACH OTHER | REMAINDER OF 3 VALUES COMPARED TO EACH OTHER | SMALLEST OF 3 VALUES COMPARED TO EACH OTHER | REMAINDER OF 3 VALUES COMPARED TO EACH OTHER | LARGEST OF 3 VALUES COMPARED TO EACH OTHER |
| AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS |
| ORIENTATION TAG TYPE 3 | | | ORIENTATION TAG TYPE 4 | | |
| REMAINDER OF 3 VALUES COMPARED TO EACH OTHER | LARGEST OF 3 VALUES COMPARED TO EACH OTHER | SMALLEST OF 3 VALUES COMPARED TO EACH OTHER | REMAINDER OF 3 VALUES COMPARED TO EACH OTHER | SMALLEST OF 3 VALUES COMPARED TO EACH OTHER | LARGEST OF 3 VALUES COMPARED TO EACH OTHER |
| AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS |
| ORIENTATION TAG TYPE 5 | | | ORIENTATION TAG TYPE 6 | | |

FIGURE 1

| ORIENTATION TAG TYPE 1 | | | ORIENTATION TAG TYPE 2 | | |
|---|---|---|---|---|---|
| LARGEST OF 3 VALUES COMPARED TO EACH OTHER | REMAINDER OF 3 VALUES COMPARED TO EACH OTHER | SMALLEST OF 3 VALUES COMPARED TO EACH OTHER | LARGEST OF 3 VALUES COMPARED TO EACH OTHER | SMALLEST OF 3 VALUES COMPARED TO EACH OTHER | REMAINDER OF 3 VALUES COMPARED TO EACH OTHER |
| AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS |

| ORIENTATION TAG TYPE 3 | | | ORIENTATION TAG TYPE 4 | | |
|---|---|---|---|---|---|
| SMALLEST OF 3 VALUES COMPARED TO EACH OTHER | LARGEST OF 3 VALUES COMPARED TO EACH OTHER | REMAINDER OF 3 VALUES COMPARED TO EACH OTHER | SMALLEST OF 3 VALUES COMPARED TO EACH OTHER | REMAINDER OF 3 VALUES COMPARED TO EACH OTHER | LARGEST OF 3 VALUES COMPARED TO EACH OTHER |
| AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS |

| ORIENTATION TAG TYPE 5 | | | ORIENTATION TAG TYPE 6 | | |
|---|---|---|---|---|---|
| REMAINDER OF 3 VALUES COMPARED TO EACH OTHER | LARGEST OF 3 VALUES COMPARED TO EACH OTHER | SMALLEST OF 3 VALUES COMPARED TO EACH OTHER | REMAINDER OF 3 VALUES COMPARED TO EACH OTHER | SMALLEST OF 3 VALUES COMPARED TO EACH OTHER | LARGEST OF 3 VALUES COMPARED TO EACH OTHER |
| AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS | AN ASCII TAG TO REPRESENT LENGTH, WIDTH OR THICKNESS |

FIGURE 3

ORIENTATION METHOD

The invention is a continuance of a provisional patent application, called "SmartLister", application No. 60/371,830, filed on Apr. 10, 2002 with a confirmation number of 1709. It is therefore petitioned that that the original provisional patent application be converted to non-provisional status under 37 CFR §1.53(c)(3) to an utility patent.

FIELD OF THE INVENTION

The present invention relates to creating cut lists, mill lists, part lists and bill of materials and, more particularly, to creating these lists in a fashion that is computer automated by retrieving three bounding box size values of one or more CAD objects and then determining which values are the length, width and thickness based on comparing these values to each other and determining what is largest size value, what is the smallest size value and what is the remainder size value of each CAD object's bounding box sides and then coping these size values to length, width and thickness columns using a set of three orientation variables that define orientation by their placement order and their set representative association to length, width and thickness.

BACKGROUND OF THE INVENTION

A quick and easy way to extract the three bounding box size values of CAD objects and associate those size values to length, width and thickness and then create a cut list, mill list, bill of materials or parts list.

The creation of a cut list, mill list, bill of materials or parts lists with size values specifically stated as length, width and thickness is necessary for the cutting of materials that have a specific orientation to a cutting device, such as wood or stainless steel which have a grain or other visible or not-visible characteristic that necessitates that it be cut in predetermined direction.

Other solutions include parametrics, measuring by hand, associating the length, width and thickness to x, y and z vectors and stereo lithography. None of these solutions are an exact solution to the problem, but instead are work-a-rounds that have become commonplace due to the lack of a truly working solution.

Because of the originality of this invention, patent searches in the Untied States and in foreign countries produced no results that were relevant to the scope of this invention.

Parametrics is the process of using a database or dimensional value or an equation value that is associated with a dimensional value to drive an object. Parametrics can be time consuming and difficult to use. You are required to input data in order to change a objects size. It is frequently necessary to do several calculations to determine what that size value is that you need to input and therefore it can be very time consuming. Parametrics can also require objects to be constrained or locked to each other in order to have the size of an assembly update predictably. Many of the object's sizes can be dependent on another object's size through formulas. Sometimes, it is not immediately clear which object is dependent on other objects and/or formulas and/or previously defined constraints or locks. This inhibits design creativity, introduces complexity and requires additional management of the CAD drawing.

Measuring by hand is a slow process that requires that each side of an object is measured and then written or input into some sort of cut list or mill list. This process is time consuming and frequently produces errors due to mistyping information and/or incorrectly measuring the original object.

Associating x, y and z vectors to length, width and thickness creates a situation that is limited by the rotation of an object. If an objects y vector is associated to length and then the object is rotated 90 degrees on the z-axis, the length would now be determined by the x vector and therefore the value returned by that y vector would be not be the length of the object. Additionally, this process is limited to objects that are aligned to the x, y and z vectors. Objects that are rotated and/or 3D rotated would be on vectors that are not clearly x, y or z.

Stereo lithography requires that the basic raw material has no specific object orientation at the time of production.

It is therefore an object of the invention to create cut lists, mill lists, bill of materials or part lists from CAD objects.

It is another object of the invention to create cut, lists, mill lists, bill of materials or part lists in a way that avoids errors.

It is another object of the invention to create cut, lists, mill lists, bill of materials or part lists in a way that saves time.

It is another object of the invention to create cut, lists, mill lists, bill of materials or part lists in a way that does not hamper design flexibility.

It is another object of the invention to create cut, lists, mill lists, bill of materials or part lists by using existing information in a way that the user can easily interact.

It is another object of the invention to promote to usage of CAD systems and automated manufacturing equipment.

It is another object of the invention to save money on materials.

It is another object of the invention to assist in determining to basic raw materials needed to produce a project or job.

It is another object of the invention to ensure that the cut list generated is an exact dimensional replica of the CAD drawing and that intended design elements are also transferred to the cut list.

SUMMARY OF THE INVENTION

In accordance with the present invention, there is provided a computerized method for interfacing with the user of a CAD program that extracts the three bounding box size values of objects and then moves the values into the appropriate length, width and thickness columns of a grid or table.

An orientation tag standard is created consisting of three positions and three variables to define a "standard orientation tag".

From left to right, the first or far left standard orientation tag position is assigned to the largest size value, the second or middle position is assigned to the remainder size value and the last or far right position is assigned to the smallest size value.

Each of the three orientation variables is defined as always representing length, width and thickness. Length runs parallel to the grain, width runs perpendicular to the grain and thickness is subject to the manufacturing processes that created the source material.

The three variables of the standard orientation tag are predefined as the "standard" to be used. The character "L" is assigned to represent length, the character "W" is assigned to represent width and the character "T" is assigned to represent thickness.

The points, in x, y and z space, of the chosen CAD objects are retrieved and then mathematically processed to determine the three bounding box size values.

The CAD object is now displayed to the user as an item with three size values.

The CAD user now determines which sides of the object are the length, width and thickness.

The CAD user now inputs the chosen, predefined, variable letters L, W and T in size order, from left to right and biggest to smallest, as per the orientation tag standard, and that data is attached to the object as external data.

If the variable letters are entered as LWT, then the largest size value mathematically determined would be the length, the remainder size value will be the width and the smallest size value will be the thickness.

If the variable letters are entered as LTW, then the largest size value mathematically determined would be the length, the remainder size value will be the thickness and the smallest size value will be the width.

If the variable letters are entered as WLT, then the largest size value mathematically determined would be the width, the remainder size value will be the length and the smallest size value will be the thickness.

If the variable letters are entered as WTL, then the largest size value mathematically determined would be the width, the remainder size value will be the thickness and the smallest size value will be the length.

If the variable letters are entered as TWL, then the largest size value mathematically determined would be the thickness, the remainder size value will be the width and the smallest size value will be the length.

If the variable letters are entered as TLW, then the largest size value mathematically determined would be the thickness, the remainder size value will be the length and the smallest size value will be the width.

With the CAD user's input, the orientation tag of the variable letters L, W and T, in any order, is then attached to the CAD object.

Each chosen object's three, mathematically determined, bounding box size values is then compared to each other to find which is the largest, smallest and what remains.

The largest distance value returned, when comparing the three bounding box size distance values of the object in reference to each other, is then copied to a column that is representative of the first variable orientation tag.

If the first variable letter is L, that distance value is copied to the length column.

If the first variable letter is W, that distance value is copied to the width column.

If the first variable letter is T, that distance value is copied to the thickness column.

The smallest value returned, when comparing the three bounding box size values of the object in reference to each h other, is then copied to a column that is representative of the last variable of the of the orientation tag.

If the last variable letter is L, that distance value is copied to the length column.

If the last variable letter is W, that distance value is copied to the width column.

If the last variable letter is T, that distance value is copied to the thickness column.

The remainder value returned, when comparing the three bounding box size values of the object in reference to each other, is then copied to a column that is representative of the middle or center variable of the of the one station tag.

If the middle or center variable letter is L, that distance value is copied to the length column.

If the middle or center variable letter is W, that distance value is copied to the width column.

If the middle or center variable letter is T, that distance value is copied to the thickness column.

Each chosen CAD object is processed until there are no more objects to process.

The CAD user now can move or copy this data, with standard devices, to new locations and/or the user can print the data.

Optionally, the three standard orientation tag positions associated to biggest, smallest and remainder can be any position within the tag and in any order. It only needs to be predefined as the set standard to be used.

Optionally, the three variable representing length, width and thickness can be any multiple of variables or even the spelling of the entire words of length, width and thickness. Even symbols can be used, so long as the representative variable character, variable characters or variable symbols are a set standard to be used.

Optionally, the orientation data can be tracked by an monitored by computer code, if the three bounding box size values are stored for later reference. Computer code can then update and or modify the orientation tag to represent any changes in the size of the CAD object.

BRIEF DESCRIPTION OF THE DRAWINGS

A complete understanding of the present invention may be obtained by reference to the accompanying drawings, when considered in conjunction with the subsequent, detailed description, in which:

FIG. 1 is a top view of the six possible orientation tag standards;

FIG. 3 is a top view of an example of calculations based on orientation tag type 1.

For purposes of clarity and brevity, like elements and components will bear the same designations and numbering throughout the FIGURES.

DESCRIPTION OF THE PREFERRED EMBODIMENT

Figure 2:
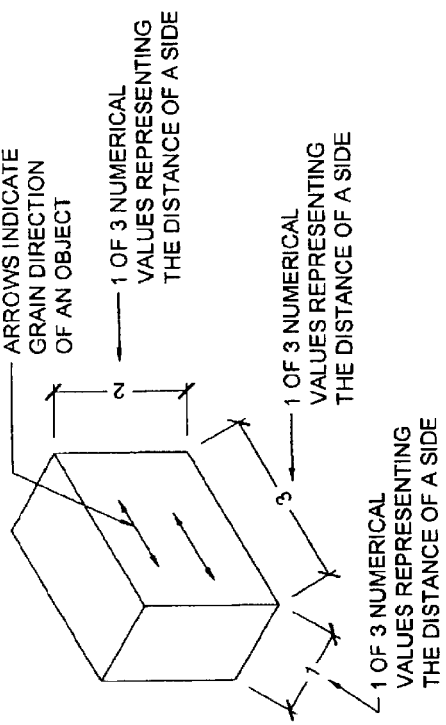
FIG. 2 is a top view of an example of a bounding box of a 3D CAD object with variables chosen to represent length, width and thickness.

FIG. 1 is a matrix of the six possible orientation tag standards 1.

FIG. 2 is an example matrix showing how three distance values can be associated to length, width and thickness can be determined based on using orientation standard type 1 and the six different possible arrangement of the variable letters of L, W and T that were chosen.

Figure 3:
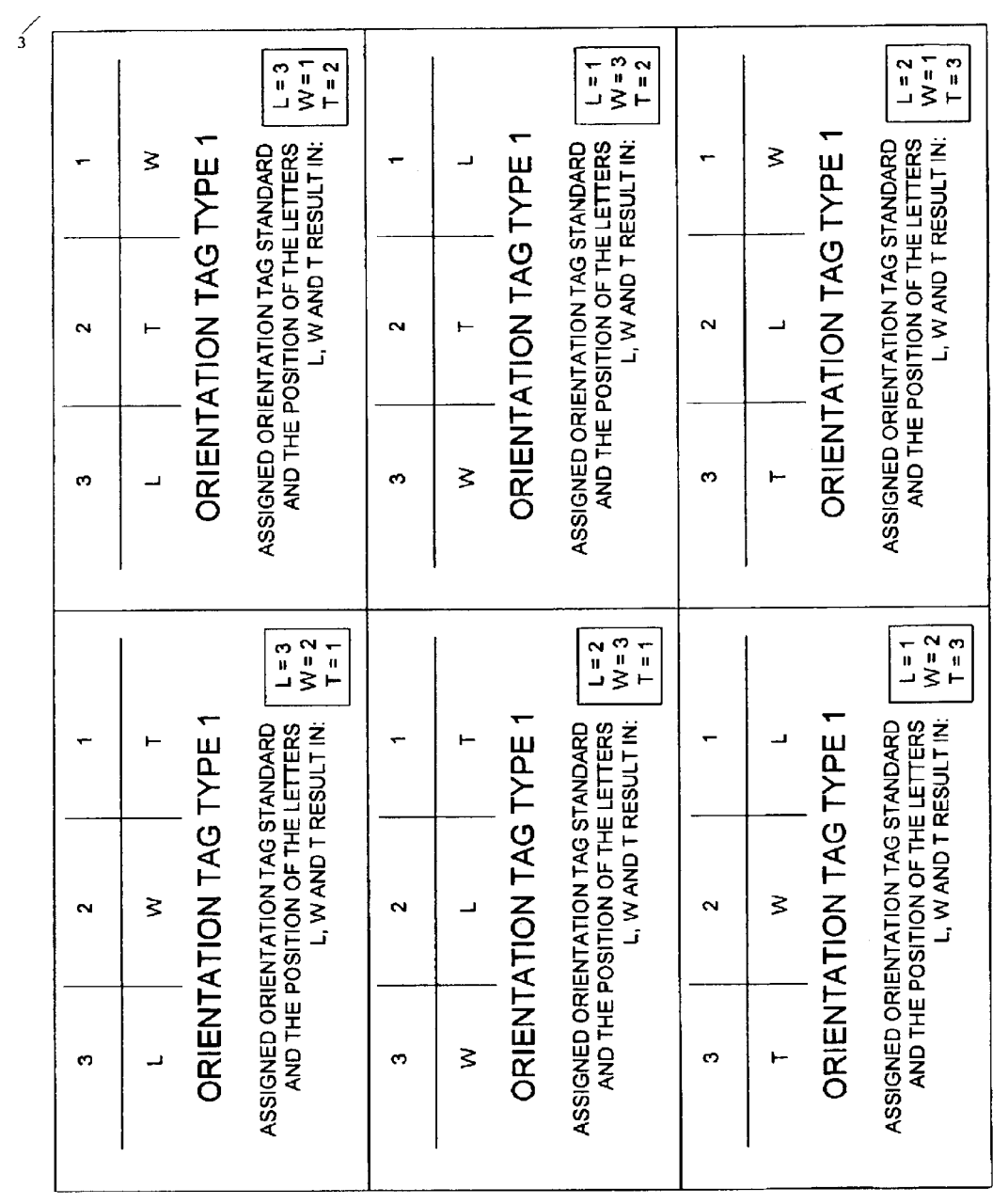

FIG. 3 is graphical example of a 3D bounding box 10 and three variable letters chosen to represent length, width and thickness.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of using a CAD system to create a table of values for physically processing a three-dimensional object based on an orientation thereof, the steps comprising:
   a) providing a CAD system and generating a three-dimensional (3D) representation of a physical object therewith, said physical object having a predetermined orientation relative to a mass of material from which said physical object is formed;
   b) creating a bounding box around said 3D representation, said bounding box comprising three pairs of mutually orthogonal, parallel surfaces, each of said pairs of mutually orthogonal, parallel surfaces being parallel to a respective one of an X, a Y, and a Z-axis;
   c) determining the three dimensions of said bounding box;
   d) rank ordering said three dimensions;
   e) associating a designation with each of said rank ordered dimensions indicating that each dimension corresponds to one of: a length, a width, and a thickness of said physical object, respectively;
   f) storing said rank ordered values and said associated designations in an ordered arrangement;
   whereby said stored, rank ordered values and associated designations define a length, width, and thickness of a quantity of said material from which said physical object may be formed in said predetermined orientation.

2. The method of using a CAD system to create a table of values for physically processing a three-dimensional object as recited in claim 1, wherein said ordered arrangement comprises at least one of: a vector, table, and a row of a gird.

3. The method of using a CAD system to create a table of values for physically processing three-dimensional object as recited in claim 1, wherein said ordered arrangement comprises a standard orientation tag.

4. The method of using a CAD system to create a table of values for physically processing a three-dimensional object as recited in claim 1, wherein said rank ordering step (d) comprises rank ordering said three dimensions from largest to smallest.

5. The method of using a CAD system to create a table of values for physically processing a three-dimensional object as recited in claim 1, wherein said physical object comprises at least two physical objects and said step (a)–(e) are performed iteratively until each of said at least two physical objects has been evaluated.

6. The method of using a CAD system to create a table of values for physically processing a three-dimensional object as recited in claim 5, wherein each set of said rank ordered values associated with respective ones of said at least two physical objects comprise a separate row in a table.

7. The method of using a CAD system to create a table of values for physically processing a three-dimensional object as recited in claim 6, wherein said table comprise at least one of the objects: a cut list, mill list, and a bill of materials.

8. The method of using a CAD system to create a table of values for physically processing a three-dimensional object as recited in claim 1, wherein said material comprises a grain structure.

9. The method of using a CAD system to create a table of values for physically processing a three-dimensional object as recited in claim 8, wherein said length dimension corresponds to a dimension of said physical object oriented parallel to said grain structure.

* * * * *